US012604175B2

(12) United States Patent
Ramirez et al.

(10) Patent No.: US 12,604,175 B2
(45) Date of Patent: Apr. 14, 2026

(54) METHOD OF TRACKING ESIMS

(71) Applicant: Boost SubscriberCo LLC, Englewood, CO (US)

(72) Inventors: James Ramirez, Littleton, CO (US); Laurel Dumonteil, Centennial, CO (US); Harold Stearns, Erie, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 476 days.

(21) Appl. No.: 18/059,853

(22) Filed: Nov. 29, 2022

(65) Prior Publication Data

US 2024/0179511 A1　May 30, 2024

(51) Int. Cl.
H04W 8/18　(2009.01)

(52) U.S. Cl.
CPC .................................... H04W 8/183 (2013.01)

(58) Field of Classification Search
CPC ....... H04W 4/90; H04W 8/183; H04W 8/186; H04W 8/20; H04W 8/22; H04W 8/24; H04W 8/205; H04W 12/00; H04W 12/04; H04W 12/41; H04W 12/42; H04W 12/72
USPC .......................................................... 455/419
See application file for complete search history.

(56) References Cited

U.S. PATENT DOCUMENTS

| | | | | |
|---|---|---|---|---|
| 2014/0073375 | A1* | 3/2014 | Li | H04W 12/069 |
| | | | | 455/558 |
| 2016/0044493 | A1* | 2/2016 | Schell | H04W 8/205 |
| | | | | 455/411 |
| 2017/0013442 | A1* | 1/2017 | Li | H04W 8/20 |
| 2017/0149827 | A1* | 5/2017 | Sims | H04L 63/102 |
| 2017/0272945 | A1* | 9/2017 | Link | H04W 12/041 |
| 2017/0280321 | A1* | 9/2017 | Caceres | G06F 21/34 |
| 2017/0300854 | A1* | 10/2017 | Harcar | G06K 19/06103 |
| 2017/0366962 | A1* | 12/2017 | Kim | H04W 8/18 |
| 2020/0288298 | A1* | 9/2020 | Li | H04W 8/183 |
| 2020/0322884 | A1* | 10/2020 | Di Girolamo | H04W 12/06 |
| 2021/0360566 | A1* | 11/2021 | Liu | H04W 8/24 |
| 2022/0232385 | A1* | 7/2022 | Seo | H04W 8/183 |
| 2022/0386105 | A1* | 12/2022 | Jung | H04W 12/45 |
| 2023/0011447 | A1* | 1/2023 | Gundavelli | H04W 8/205 |
| 2023/0125133 | A1* | 4/2023 | Dreiling | H04W 8/183 |
| | | | | 455/558 |
| 2023/0254675 | A1* | 8/2023 | Shah | H04W 8/205 |
| | | | | 455/426.1 |
| 2023/0300598 | A1* | 9/2023 | Huang | H04W 4/24 |
| | | | | 455/406 |
| 2023/0354006 | A1* | 11/2023 | Chughtai | H04W 8/18 |

(Continued)

*Primary Examiner* — Jean A Gelin
(74) *Attorney, Agent, or Firm* — Kilpatrick Townsend & Stockton LLP

(57) ABSTRACT

A data structure for managing inventory information of a user device from an inventory of user devices is provided. In one example, the data structure includes: a device document containing a general product profile of a device from an inventory and a first device identity profile of the device; an embedded universal integrated circuit card (eUICC) document containing multiple data fields describing an eUICC embedded in the device, wherein the eUICC contains at least one embedded subscriber identification module (eSIM); and an eSIM profile document comprising at least one eSIM profile corresponding to the at least one eSIM contained in the eUICC, wherein the at least one eSIM profile contains multiple attributes describing the eSIM.

20 Claims, 8 Drawing Sheets

(56) References Cited

U.S. PATENT DOCUMENTS

| 2023/0354040 | A1* | 11/2023 | Li | ..................... | H04W 12/0431 |
| 2023/0370832 | A1* | 11/2023 | Vaidyanathan | ....... | H04W 8/205 |
| 2023/0370836 | A1* | 11/2023 | Traynor | ............... | H04W 8/205 |
| 2023/0422017 | A1* | 12/2023 | Dietze | ................... | H04W 8/183 |
| 2024/0089732 | A1* | 3/2024 | Mayalil | .............. | H04W 12/126 |
| 2024/0422527 | A1* | 12/2024 | Ruiz Litwinski | ....... | H04W 8/20 |

* cited by examiner

300

300'

400

500

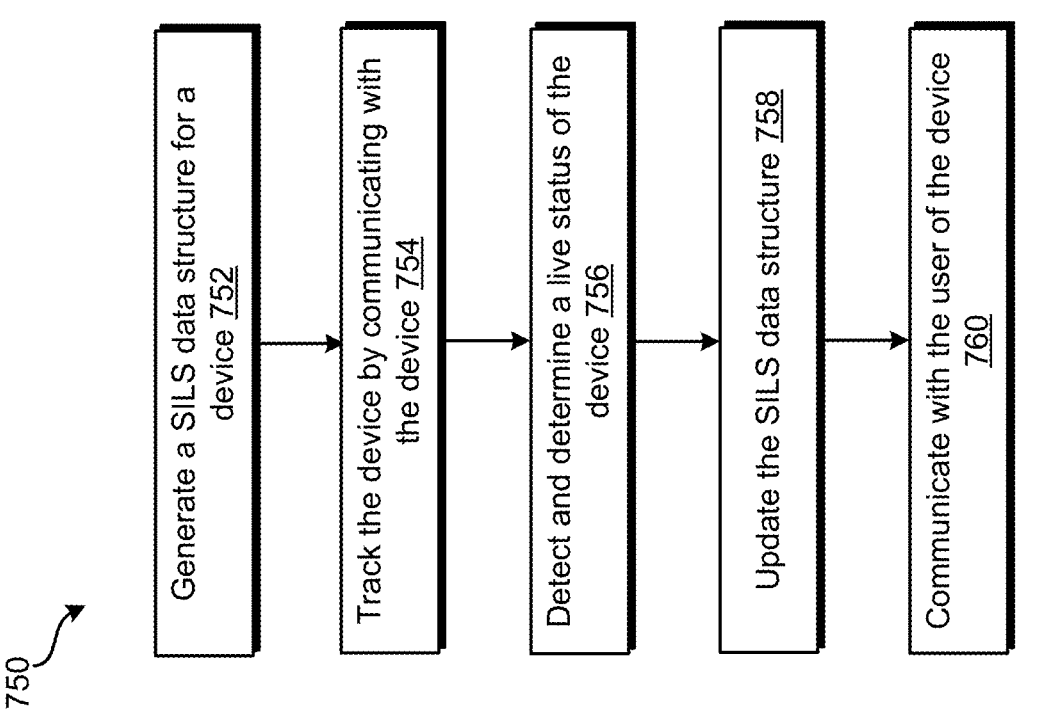

750

Generate a SILS data structure for a device 752

Track the device by communicating with the device 754

Detect and determine a live status of the device 756

Update the SILS data structure 758

Communicate with the user of the device 760

Generate a device document 702

Generate a UICC document 704

Generate a SIM profile document 706

Generate an eUICC document 708

Generate an eSIM profile document 710

METHOD OF TRACKING ESIMS

BACKGROUND OF THE INVENTION

The present disclosure relates generally to inventory management, and more particularly systems and methods for tracking inventory items.

In a product distribution environment, particularly in the telecommunications industry, it is common for a company to track the movement and status of inventory for the subscriber equipment and service it provides. For effective inventory management, a company generally must have the ability to collect inventory information for each subscriber equipment item (e.g., a wireless mobile device), review the current state of an item, issue and track the status of purchase orders and work orders, monitor production and distribution, and provide stock adjustments. The accuracy and availability of such inventory information are vital as carriers, customers, operations, and various functions of the company typically rely on such information for reporting purposes, as well as to make important short-term and long-term business decisions.

Further, the company needs to track the subscriber equipment item in its life cycle to obtain a status of the tracked item, before and after the item leaves the inventory. The status of the inventory item may provide the company with abundant information regarding various aspects of the inventory item, which are useful to the company for improving customer service, marketing, inventory control, and other aspects of business operation. Therefore, there exists a need for systems and methods for tracking inventory items.

BRIEF SUMMARY OF THE INVENTION

In some embodiments, a data structure for managing a user device from an inventory of user devices is provided. In one example, the data structure includes: a device document containing a general product profile of a device from an inventory and a first device identity profile of the device; an embedded universal integrated circuit card (eUICC) document containing multiple data fields describing an eUICC embedded in the device, wherein the eUICC contains at least one embedded subscriber identification module (eSIM); and an eSIM profile document comprising at least one eSIM profile corresponding to the at least one eSIM contained in the eUICC, wherein the at least one eSIM profile contains multiple attributes describing the eSIM. In some embodiments, the data structure further includes a second device identity profile of the device, wherein the second device identity profile is included in the device document; a universal integrated circuit card (UICC) document containing multiple data fields describing a UICC removably and operably attached to the device, wherein the UICC contains at least one subscriber identification module (SIM) card; and a SIM profile document containing multiple attributes describing the SIM.

In some embodiments, a computer-implemented method for tracking an inventory item, in particular, a user device from an inventory of user devices is provided. In one example, the method includes: (1) generating a data structure for a user device from an inventory of user devices, the data structure including a device document containing a general product profile of the user device and a first device identity profile of the user device; an embedded universal integrated circuit card (eUICC) document containing multiple data fields describing an eUICC embedded in the user device, wherein the eUICC contains at least one embedded subscriber identification module (eSIM); an eSIM profile document comprising at least one eSIM profile corresponding to the at least one eSIM contained in the eUICC, wherein the at least one eSIM profile contains multiple attributes describing the eSIM; a second device identity profile of the device, wherein the second device identity profile is included in the device document; a universal integrated circuit card (UICC) document containing multiple data fields describing a UICC removably and operably attached to the device, wherein the UICC contains at least one subscriber identification module (SIM) card; and a SIM profile document containing multiple attributes describing the SIM; (2) tracking the user device by transmitting a wireless signal to the user device, the wireless signal containing an inquiry to a live status of the user device with respect to the user device, the eUICC, the eSIM, the UICC, and the SIM; (3) receiving a responsive signal from the user device, the responsive signal containing data or information indicating a live status of the device with respect to the user device, the eUICC, the eSIM, the UICC, and the SIM; (4) determining a change of status of the user device; (5) updating the data structure to incorporate the live status of the user device with respect to the user device, the eUICC, the eSIM, the UICC, and the SIM; and (6) initiating a communication with a user of the user device to inform the user of the live status and the change of status of the user device with respect to the device, the UICC, SIM, eUICC, and eSIM.

BRIEF DESCRIPTION OF THE DRAWINGS

FIG. 7A is a flowchart diagram illustrating an example method according to various embodiments.

FIG. 7B is a flowchart diagram illustrating an example method according to various embodiments.

DETAILED DESCRIPTION OF THE INVENTION

Figure 1:
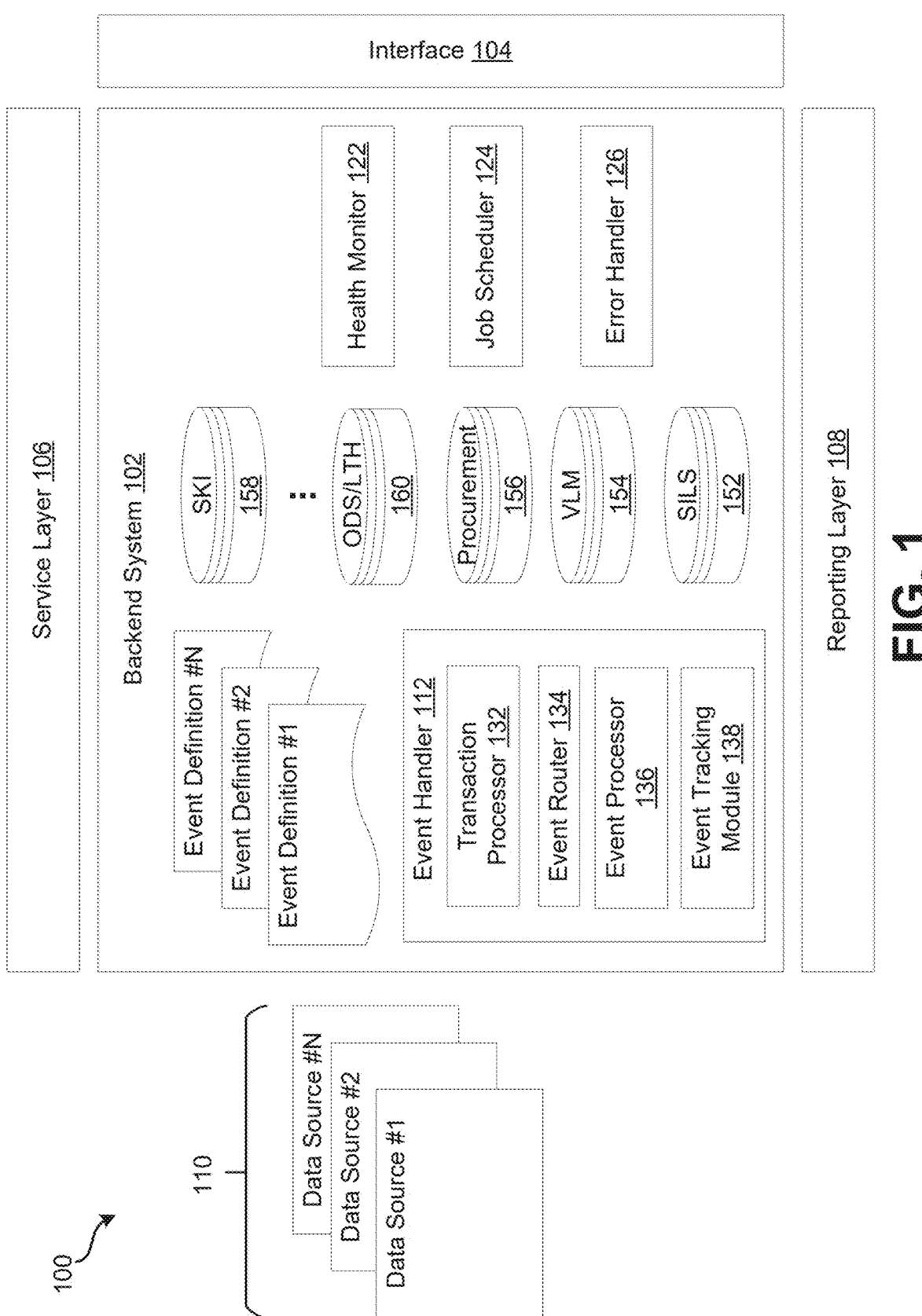
FIG. 1 is a schematic diagram illustrating an example system according to various embodiments.

As used herein, the term "mobile device" or "mobile communication device" refers to any one or all of cellular telephones, smartphones, personal or mobile multi-media players, personal data assistants, laptop computers, tablet computers, smart books, smart watches, palm-top computers, wireless electronic mail receivers, multimedia Internet-enabled cellular telephones, wireless gaming controllers, and similar personal electronic devices that include a UICC or eUICC, one or more SIM modules or eSIM modules, a programmable processor, memory, and circuitry for connecting to at least two mobile communication network with one or more shared radio frequency (RF) resources. Various examples may be useful in mobile communication devices, such as smartphones, and so such devices are referred to in the descriptions of various examples. However, the examples may be useful in any electronic devices that may individually maintain a plurality of subscriptions that utilize at least one shared RF chain, which may include one or more of antennae, radios, transceivers, etc.

As used herein, the terms "UICC," "SIM module," "SIM card," and "subscriber identification module" are used interchangeably to refer to a memory module that may be an integrated circuit embedded into a removable card having a physical form factor that stores an International Mobile Subscriber Identity (IMSI), related key, and/or other information used to identify and/or authenticate the mobile device on a network and enable a communication service with the network. All GSM, UMTS, and LTE network mobile phone users have a unique identification associated with them known as an IMSI. Because the information stored in a UICC or SIM enables the mobile communication device to establish a communication link for a particular communication service with a particular network, the term "subscription" is used herein as a shorthand reference to refer to the communication service associated with and enabled by the information stored in a particular UICC or SIM as the UICC or SIM and the communication network, as well as the services and subscriptions supported by that network, correlate to one another.

As used herein, the terms "eUICC," "eSIM module," "eSIM card," "embedded subscriber identification module," "iUICC,", "iSIM module,", "iSIM card,", and "integrated subscriber identification module" are used interchangeably to refer to a memory module that may be an integrated circuit embedded into or integrated with a mobile device that stores an International Mobile Subscriber Identity (IMSI), related key, and/or other information used to identify and/or authenticate the mobile device on a network and enable a communication service with the network. Unlike the traditional SIM card, the eSIM is usually treated as a programmable SIM or digital SIM that users to activate a cellular plan from a carrier without having to use a physical SIM card. An eSIM may use a software-based SIM embedded into an unremovable eUICC.

An eUICC is the equivalent of a SIM card that is implemented in memory and supports the downloading and installation of multiple mobile network operator profiles, or subscription profiles, in its secure domain. Thus, a single eUICC may support more than one subscription, unlike traditional SIM cards that each support one subscription at a time. Further, users may upload subscription identifying information to an eUICC to add a subscription instead of replacing a physical SIM card. The eUICC allows the eUICC provider to manage the profiles associated with the eUICC, such as enabling profiles, disabling profiles, deleting profiles, resetting the memory of the eUICC (e.g., to delete all profiles), querying the list of profiles, and renaming of profiles.

An eUICC also allows one profile to be enabled at any time. If a user wants to activate or enable another subscription profile, the active subscription is deactivated first by performing a detach procedure between the active subscription and its respective network, and then the new subscription is activated by performing an attach procedure with its respective network. Thus, while the eUICC may support more than one subscription, the subscriptions cannot be simultaneously active on the eUICC. During the detach and attach procedure for switching subscriptions the user may not be able to utilize any subscription, and thus may not place or receive calls. The detach and attach procedure for switching subscriptions may take a long time from the perspective of a user eager to place or receive a call.

In various embodiments, a novel data structure is provided. In those embodiments, the novel data structure may be referred to as serialized inventory live status (SILS) data structure for a device. In this SILS data structure, a eUICC container is linked with an individual device in an inventory system. For example, the eUICC container is linked with a mobile device. In those embodiments, different eSIMS can be assigned to the mobile device during a life cycle of the mobile device while being active. The SILS data structure enables a live status checking/tracking of the eSIMs in the mobile device in the inventory system.

In various embodiments, the novel SILS data structure for a device includes an eUICC container and a UICC container. In those embodiments, both the eUICC and UICC containers are linked with the device. In this way, the device can be tracked throughout the life cycle of the device for multiple types of vendors. For example, the device can be assigned to a vendor that supports an eSIM and as well as a physical SIM at a first period of the device's life cycle, be assigned to another vendor that supports multiple eSIMs at a second period of the device's life cycle, be assigned to yet another vendor that only supports a physical SIM at a third period the device's life cycle, and so on.

FIG. 1 is a schematic diagram illustrating an example system 100 configured to facilitate SILS data structure in accordance with one embodiment. In that embodiment, the system 100 is configured to manage a supply chain for a service/product provider, manage an inventory of products, establish and maintain a serialized inventory database, and track an inventory item, in accordance with the present disclosure. In the illustrated example, the system 100 includes, among other components, a backend system 102, an interface layer 104, a service layer 106, a reporting layer 108, and data sources 110. In various implementations, the system 100 may include one or more electronic processors configured to implement various functions provided the components of system 100, such as those shown in FIGS. 2-7. It should be understood, the system 100 is not limited by its constituent components shown in this example. That is, it is not intended to limit the system 100 to one single computer device or more than one computer device. In accordance with the present disclosure, system 100 can be implemented by one or more computer device.

As shown in FIG. 1, the backend system 102 includes, among other components, an event handler 112, multiple databases, a health monitor module 122, a job scheduler 124, and an error handler 126. The multiple databases may include a serialized inventory live status (SILS) database 152, a virtual location management (VLM) database 154, a procurement database 156, a stock keeping unit information (SKI) database 158, an event history (transaction history) database 160. Other databases may also be included in the backend system 102. In addition, the databases included in the backend system 102 may be consolidated or integrated or otherwise share the same database platform.

The event handler 112 is configured to handle individual events received/generated by the backend system 102. A given individual event can indicate a creation/modification/retrieval of one or more data records managed by the backend system. In this example, the event handler 112 includes, among other components, a transaction processor 132, an event router 134, an event processor 136, an event tracking module 138.

In this example, the transaction processor is configured to process a transaction received as indicated by an event received by the event handler 112. For instance, a manual transaction of a new device activation may be entered through interface layer 104, which, in turn, generate an event of recording the device activation. This event is intercepted by the event handler 112 and a transaction of the new device is activation can be recorded in procurement database 156 through the transaction processor 132.

In this example, the event router 134 is configured to route an event received by the event handler 112 to an appropriate sub-module of the event handler 112 based one or more definitions of the events. For instance, the event of the new device activation is routed to the event processor 136 for further processing, and an event of device tracking request is routed to the event track module 138 for further processing. As shown, individual definitions of the events can be stored in the backend system 102. A given definition of a particular event can specify one or more actions to be taken upon receiving this event by the event handler 112.

In this example, the event processor 136 is configured to process an event received by the event handler 112. For instance, the new device activation event request can be received by the event processor 136, which, in turn, is configured to instruct the transaction processor 132 to create a record in the procurement database 156 as a result of the new device activation event received by the event handler 112.

The event tracking module 138 is configured to track one or more events received by the event handler 112. For example, the events received by the event handler 112 can include an event inquiring a status of a particular device. After receiving this event, the event router 134 routes the event to the event tracking module, which, in turn, generates an inquiry into the VLM database 154 for a status for the particular device.

As can be seen, in this example, the backend system 102 includes various databases including a SILS database, a virtual location management (VLM) database 154, a procurement database 156, a SKI database 158, an ODS/LTH database 160, and/or any other databases. In this example, the SILS database is configured with SILS data structures in accordance with the disclosure. The SILS database thus is enabled to persist eSIM profiles and attributes available for individual devices in the backend system 102.

Figure 2:
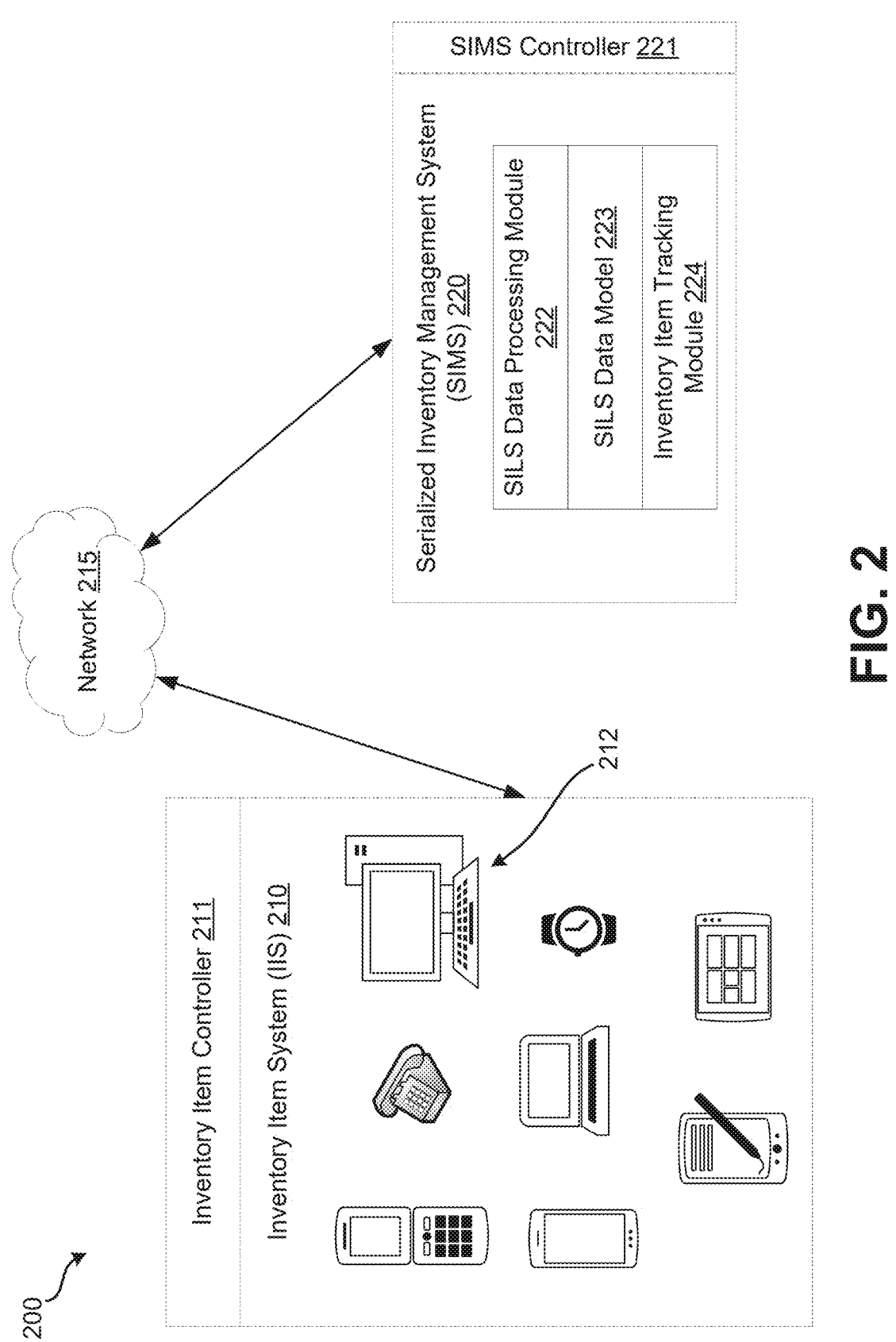
FIG. 2 is a schematic diagram illustrating an exemplary communications system for tracking an inventory item according to various embodiments.

FIG. 2 is a schematic diagram illustrating an exemplary system 200 for tracking an item of inventory using SILS data structures in accordance with another embodiment. For brevity, several elements in FIG. 2 are represented as monolithic structures. It is to be understood, however, that each structure may include numerous interconnected computing elements and/or components designed to operate according to aspects of the present disclosure.

As shown in FIG. 2, the system 200 includes an inventory system 210 connected through a network 215 to a serialized inventory management system (SIMS) 220. The inventory system 210 and the SIMS 220 are configured to communicate and exchange information through the network 215. The SIMS 220 may include and/or form part of an information delivery network, such as, for example, the Internet, the World Wide Web (Web), an online service provider, a private network, and/or any other analog or digital wired and/or wireless network that provides information.

In general, the inventory system 210 includes an inventory item 212 having hardware and/or software components for communicating with the network 215 and the SIMS 220. The inventory system 210 and SIMS 220 each may include one or more computers systems and may be structured and arranged to communicate using various communication protocols to establish connections between network elements and/or to operate within or in concert with one or more other systems (e.g., the Internet and/or Web).

In some embodiments, the inventory system 210 and the SIMS 220 each include one or more devices operating under the command of a controller (e.g., inventory item controller 211, and the SIMS controller 221). The broken lines are intended to indicate that in some implementations, the controller, or portions thereof considered collectively, may instruct one or more elements of the systems to operate as described. Accordingly, the functions described herein may be implemented as software controlling one or more elements of the inventory system 210 and/or the SIMS 220.

In some embodiments, the inventory item 212 is a subscriber equipment or subscriber device. An example of a subscriber device is a general-purpose computer capable of responding to and executing instructions in a defined manner. Other examples of a subscriber device include a special-purpose computer, a personal computer (PC), a workstation, a server, a laptop computer, a web-enabled telephone, a web-enabled personal digital assistant (PDA), a web-enabled personal computing device, a web-enabled smartphone, etc.

An example of a controller (e.g., the inventory item controller 211 or the SIMS controller 221) is a program or software application installed on one or more devices. Other examples include codes, instruction sets, signals, or some combination thereof, for independently or collectively providing instructions. The controller may be implemented utilizing any suitable computer language and/or object-oriented techniques. The controller also may be embodied permanently or temporarily in any type of device, component, physical or virtual equipment, storage medium, or propagated signal capable of delivering instructions. In some embodiments, the controller (e.g., computer program, software application) may be stored on a storage medium (e.g., disk, device, propagated signal), such that if the storage medium is read by a computer system, the functions described herein are performed. In some embodiments, the inventory item 212 is a subscriber mobile device, and the inventory item controller 211 includes an eUICC or eSIM embedded into or integrated with the subscriber mobile device. In some embodiments, the inventory item controller 211 further includes a UICC or a SIM card (in a physical form factor) operably and removably attached to the subscriber mobile device.

In some embodiments, the inventory item 212 is a smartphone (e.g., a smartphone under the brand name of iPhone®, iPad®, and Samsung Galaxy®, etc.). The corresponding inventory item controller 211 includes at least one subscriber information module (SIM) card programmed to communicate a live status of the smartphone with the SIMS controller 221.

As shown in FIG. 2, the SIMS 220 includes, among other components, a serialized inventory live status (SILS) data processing module 222, a SILS data model 223, and an inventory item tracking module 224. It is noted that additional sub-systems, modules, and databases may be included in the SIMS 220 on demand. Typically, the components of the SIMS 220 may employ a common database platform with business logic residing in the appropriate modules. In general, the modules may be implemented as hardware and/or software for performing the prescribed operations. It is to be understood that while certain components of the SIMS 220 are shown as monolithic structures, each may include numerous elements (e.g., servers, routers, switches, firewalls, sockets, databases, tables, disks, hard drives, etc.) in various embodiments.

In some embodiments, the SILS data processing module 222 is configured to receive, record, analyze, and process serialized information for each inventory item or a group of common inventory items. The serialized information may be obtained from a data source and may indicate a live status of the inventory item. In some embodiments, the SILS data processing module 222 may detect a change of the live status for the inventory item and convert the change into an event, according to a pre-determined event definition.

Examples of serialized information include, but are not limited to: an electronic serial number (ESN), an international mobile equipment identification (IMEI), a mobile identification number (MIN), an unlocking code for the handset, a subscriber information module (SIM) card code, an embedded SIM (eSIM) card code, a SIM card profile, an eSIM card profile, a universal integrated circuit card (UICC) code, an embedded UICC (eUICC) code, a UICC profile, an eUICC profile, a serial number of a finished handset assembly, a serial number of a basic component (e.g., speakers, microphones, keypads, displays, ringers, processors, chipsets, memories, displays, batteries) or an add-on component (e.g., communication devices, cameras, location technologies, multimedia players) of a finished handset.

In some embodiments, the SILS data processing module 222 is configured to generate a data field (sometimes also referred to as "data entry" or "data attribute" or "attribute") and assign the serialized information to the data field with respect to each inventory item. In some embodiments, the SILS data processing module 222 is further configured to group data fields associated with a particular inventory item or a particular group of common inventory items.

The SILS data model 223 is configured to store the serialized information received and processed by the SILS data processing module 222. In some embodiments, the SILS data model 223 includes at least one SILS data structure corresponding to an inventory item 212. The SILS data structure stores information associated with the corresponding inventory item. Details of the SILS data structure will be described below with reference to FIGS. 3-7.

The inventory item tracking module 224 is configured to track the inventory item 212 according to the serialized information associated with the inventory item 212. The inventory item tracking module 224 can receive information regarding the inventory item 212 through the communication between the inventory item controller 211 and the SIMS controller 221, as mentioned above. The inventory item tracking module 224 can further determine a live status of the inventory item 212 based on the received information, update the SILS data model 223 with the status formation of the inventory item 212, and transmit the received information to other systems for further analysis (e.g., a resource planning system (EPR)). In some embodiments, the SIMS 220 may track the movement and status of the inventory item 212 and communicate information to manufacturers, distributors, carriers, customers, operations, and other company areas and partners.

In some embodiments, the system 200 may further include a resource planning system (not shown) and an order fulfillment system (not shown) that are operably connected to the SIMS 220. The resource planning system (EPR) may be configured to cover inventory quantity and cost information, while maintaining serialized information of the tracked inventory item 212. The order fulfillment system may be configured to incorporate rules and manage the operational steps of order fulfillment.

Figure 3A:
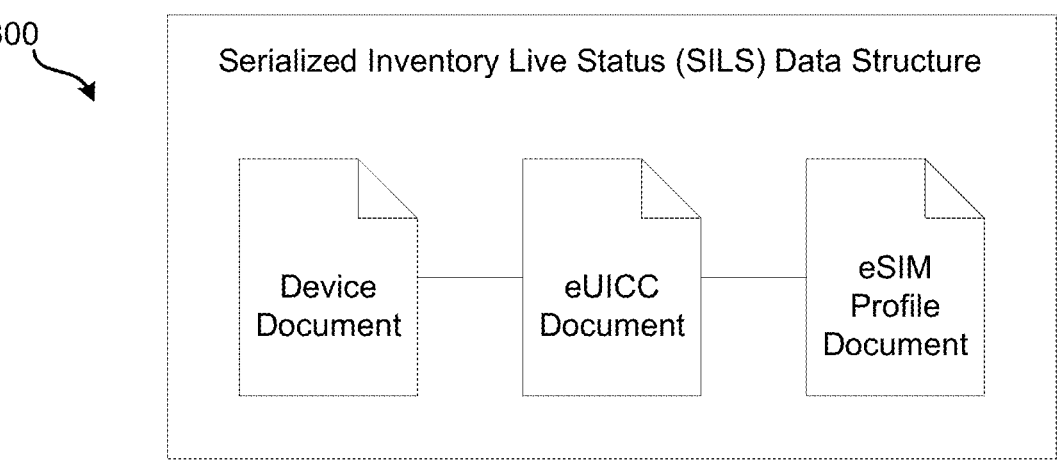
FIG. 3A is a schematic diagram illustrating an example of SILS data structure according to various embodiments.
Figure 3B:
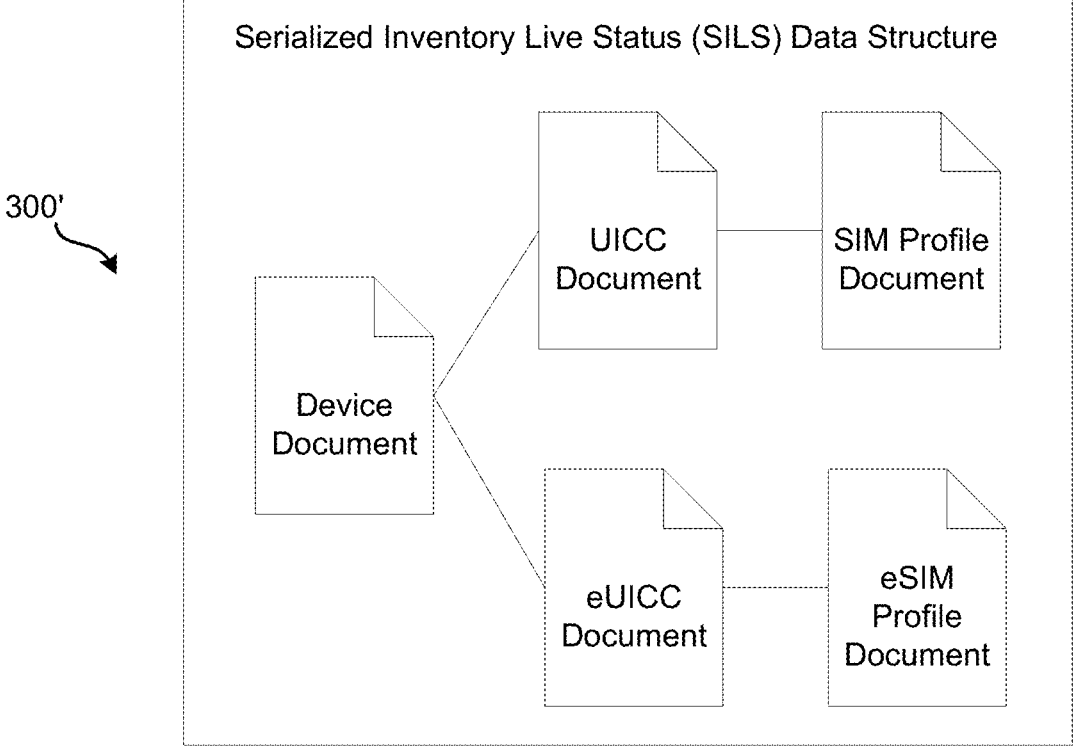
FIG. 3B is a schematic diagram illustrating another example of SILS data structure according to various embodiments.

FIG. 3A is a schematic diagram illustrating an example of SILS data structure 300 for tracking an inventory item. FIG. 3B is a schematic diagram illustrating another example of SILS data structure 300' for tracking an inventory item. The SILS data structure 300 or 300' is configured to store serialized information of an inventory item 212, wherein the inventory item 212 is a subscriber mobile device (sometimes also referred to as "device"). The SILS data structure 300 or 300' may be stored in the SILS data model 23 of FIG. 2. In some embodiments, the SILS data model 23 includes a plurality of SILS data structures respectively corresponding to a plurality of inventory items, for example, a first SILS data structure 200-1 corresponding to a first inventory item, a second SILS data structure 200-2 corresponding to a second inventory item, and so on.

As shown in FIG. 3A, the SILS data structure 300 includes, among other things, a device document 302 corresponding to the subscriber mobile device, an eUICC document 304 corresponding to the device document 302, and an eSIM profile document 306 corresponding to the eUICC document 304. The device document 302 contains general information about the subscriber mobile device such as product/manufacturing information and a serial number of the subscriber mobile device. In some embodiments, the device document 302 contains an IMEI number associated with the subscriber mobile device. The eUICC document 304 contains an eUICC number and general information regarding the eUICC that is embedded in the subscriber mobile device. In some embodiments, the eUICC functions as an eSIM container and contains one or more eSIMs embedded in the subscriber mobile device. The eSIM profile document 306 may have at least one eSIM profile. In some embodiments, more than one SIMs are embedded in the subscriber mobile device, and thus the eSIM profile document 306 may have multiple eSIM profiles, each corresponding to a particular eSIM. Each SIM profile contains various data attributes associated with the corresponding eSIM. In some embodiments, the subscriber mobile device may be associated with 9 separate and distinct eSIMs, which are contained in the eUICC.

The SILS data structure 300' is a variation of the SILS data structure 300. In the example of FIG. 3B, the subscriber mobile device is associated with both a UICC and an eUICC. The SILS data structure 300' includes, among other things, a device document 302 corresponding to the subscriber mobile device, an eUICC document 304 corresponding to the device document 302, and an eSIM profile document 306 corresponding to the eUICC document 304, a UICC document 312 corresponding to the subscriber mobile device, a SIM profile document 314 corresponding to the UICC document 312.

Figure 4:
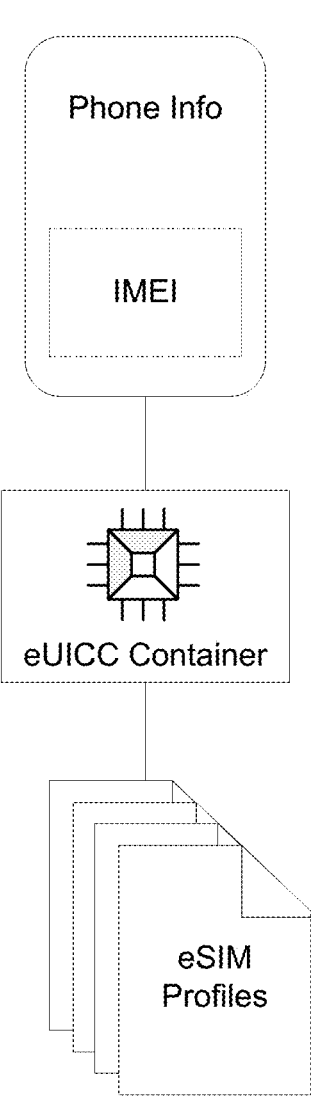
FIG. 4 is a schematic diagram illustrating another example of SILS data structure according to various embodiments.
Figure 5:
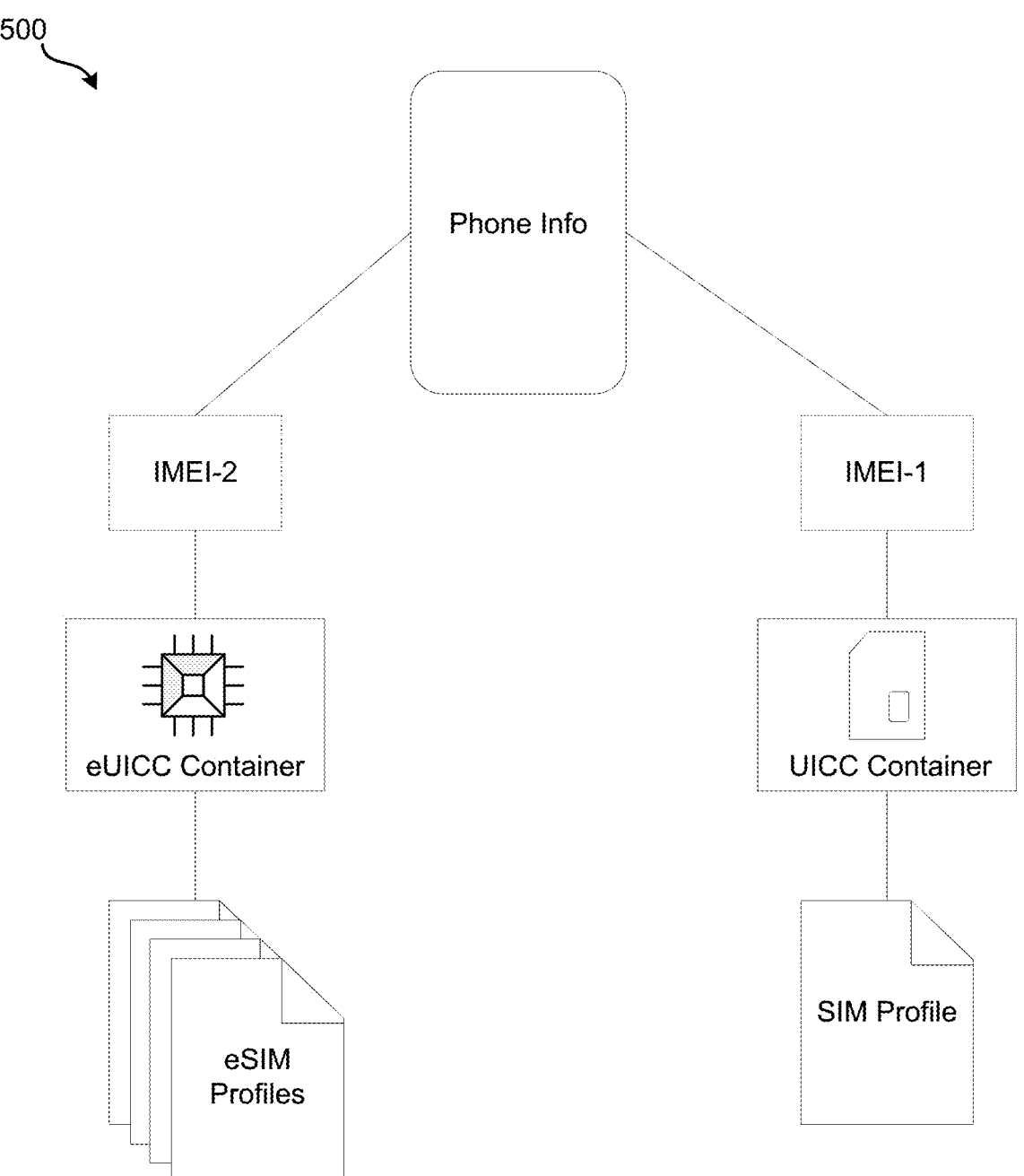
FIG. 5 is a schematic diagram illustrating another example of SILS data structure according to various embodiments.

FIG. 4 is a schematic diagram illustrating an embodiment of the SILS data structure 400 for tracking an inventory item, in particular, a phone. FIG. 5 is a schematic diagram illustrating another embodiment of the SILS data structure 500 corresponding to a phone. In the illustrated example of FIG. 4, the SILS data structure 400 includes a phone information document 402, an eUICC document 404, and an eSIM profile document 406. The phone information document 402 has an IMEI and contains an IMEI record for the phone. The eUICC document 404 contains at least one data field in relation to the eUICC embedded in the phone. The eSIM profile document 406 corresponds to the eUICC and may contain multiple eSIM profiles, each of which corresponding to a particular eSIM.

The SILS data structure 500 is a variation of the SILS data structure 400. In the example of FIG. 5, the phone has a first IMEI (denoted as IMEI-1) and a second IMEI (denoted as IMEI-2). The phone has both a UICC and an eUICC, and the UICC corresponds to the IMEI-1, and the eUICC corresponds to the IMEI-2. The SILS data structure 500' accordingly includes a phone information document 502, an eUICC document 504 corresponding to the IMEI-1, an eSIM profile document 506 corresponding to IMEI-1, a UICC document 514 corresponding to the IMEI-2, and a SIM profile document 516 corresponding to the IMEI-2. In this arrangement, the SILS data structure 500 contains information regarding both the UICC and the eUICC for the phone.

Figure 6:
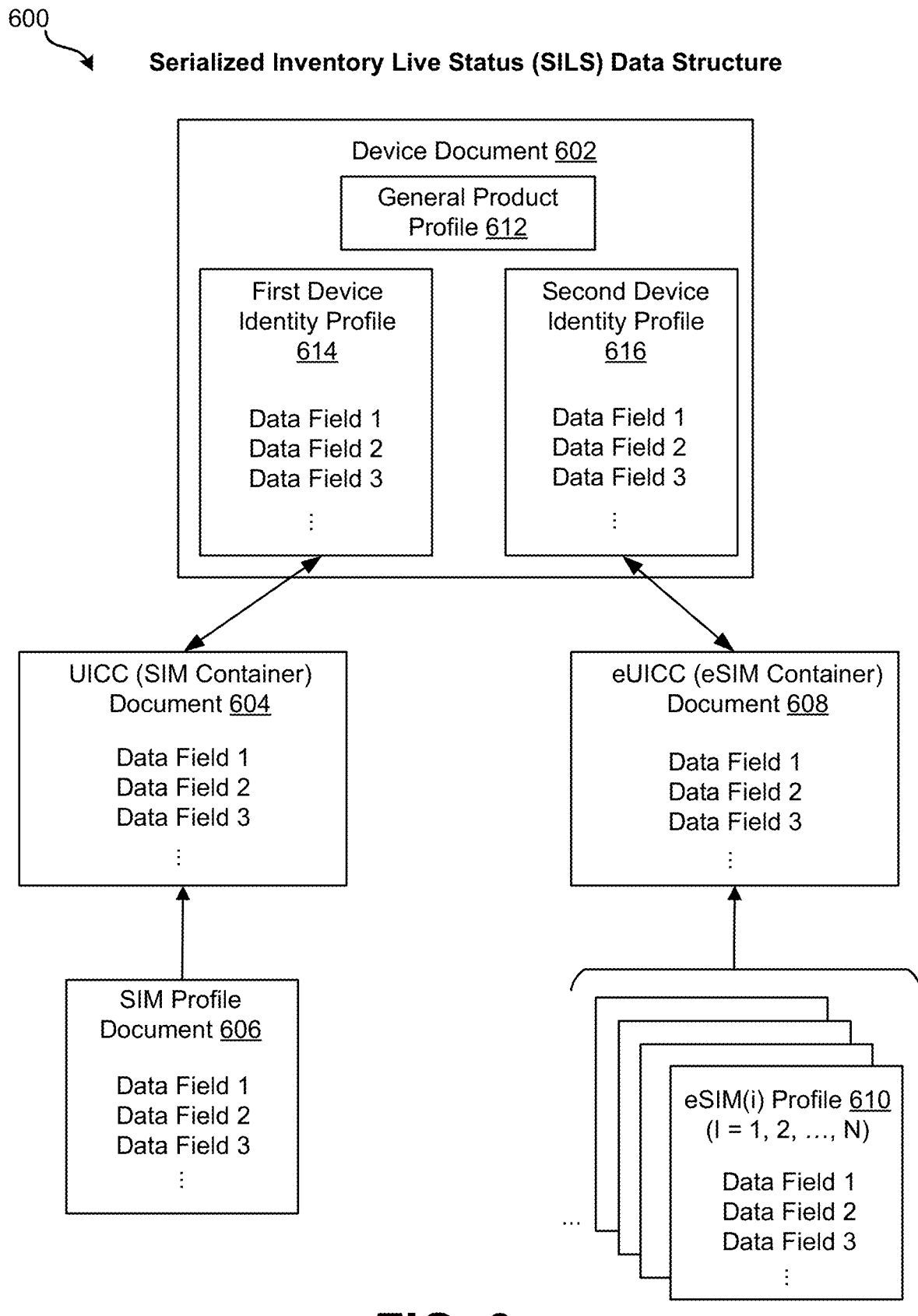
FIG. 6 is a schematic diagram illustrating another example of SILS data structure according to various embodiments.

FIG. 6 is a schematic diagram illustrating another embodiment of the SILS data structure 600 for tracking a device. In the illustrated embodiment, the SILS data structure 600 includes a device document 602, a UICC (SIM container) document 604, a SIM profile document 606, an eUICC (eSIM container) document 608, and an eSIM profile document 610.

The device document 602 includes a product information profile 612, a first device identity profile 614, and a second device identity profile 616. The product information profile 612 contains the serialized product and manufacture information of the device to be tracked. In some embodiments, the product information profile 612 include multiple data fields, e.g., data field 1, data field 2, . . . , data field N. In some embodiments, the data fields of the product information profile 612 include at least one of: a data field containing SKU information, which identifies various information about the device; a data field containing the type of document for the product information profile 612; a data field containing disposition code information about the current disposition of the device through its lifecycle; a data field containing additional information regarding the latest update to disposition code; a data field containing information regarding the brand of the device and legal values to be determined or enforced by upstream services; and a data field containing information regarding the person or entity who currently owns the device.

In some embodiments, the data fields of the product information profile 612 may additionally include at least one of: a data field containing information regarding the most recent date/time on which the device was sold; a data field containing information regarding the most recent date/time on which the device was returned; name or code of the manufacturer of the device; a data field containing information regarding the date on which the device was manufactured (if known); a data field containing information regarding the original cost for the device when acquired; and a data field containing information regarding the current monetary value of the device. When the device is tracked, the information recorded in the data fields of the product information profile 612 may be timely updated to reflect changes of the live status of the device. It is noted that in the event of any change made to the UICC document, SIM profile document, eUICC document, and eSIM profile document, corresponding changes will also be made to the device document.

The first device identity profile 614 and the second device identity profile 616 respectively contain the serialized identity information of the device in relation to the UICC and eUICC. In some embodiments, the first device identity profile 614 contains serialized information regarding the UICC. In some embodiments, the first device identity profile 614 includes at least one of: a data field containing the manufacturer-assigned unique serial number for the device; a data field containing the manufacturer's part number for the device; a data field containing the first IMEI (denoted as IMEI-1) number assigned to the first radio chip installed in the device; a data field containing information about the SIM type related to the IMEI-1; a data field containing information about the current lock/unlock status of the device with respect to the SIM associated with IMEI-1.

In some embodiments, the second device identity profile 616 includes at least one of: a data field containing the manufacturer-assigned unique serial number for the device; the manufacturer's part number for the device; a data field containing the second IMEI (denoted as IMEI-2) number assigned to the first radio chip installed in the device; a data field containing information about the SIM type related to the IMEI-2; a data field containing information about the current lock/unlock status of the device with respect to each eSIM associated with IMEI-2.

In some embodiments, the first device identity profile 614 and the second device identity profile 616 may each further include at least one of: a data field containing a record of lock/unlock status of the device, which includes but is not limited to: information about the date on which the device is eligible to be unlocked with respect to each SIM and eSIM; a data field containing information about a future date to perform a temporary unlock (seasonal unlock) of the device with respect to each SIM and eSIM; a data field containing information about a future date to lock the device (closing a seasonal unlock window) with respect to each SIM and eSIM; a data field containing message(s) to convey any immediate error codes or success message feedback to the user of the device with respect to each SIM and eSIM; and a data field containing the network unlock PIN code (encrypted); and so on.

The UICC (SIM container) document 604 contains information regarding the SIM card associated with the first device identity profile (e.g., IEMI-1). In some embodiment, the UICC (SIM container) document 604 includes at least one of: a data field containing the Integrated Circuit Card Identifier (ICCID) number, which is the identifier of the UICC hardware; a data field containing information regarding the installation status of the UICC (SIM card); a data field containing information regarding the manner the SIM card can be triggered for changes (by network carrier or by the user).

The eUICC (eSIM container) document 608 contains information regarding the eSIM(s) associated with the first device identity profile (e.g., IEMI-2). In some embodiments, the eUICC (eSIM container) document 608 includes at least one of: a data field containing the Embedded Integrated Circuit Card Identifier (EID) number, which is the identifier of the eUICC; a data field containing information regarding the installation status of the eUICC and each eSIM associated therewith; a data field containing information regarding the manner the eSIM can be triggered for changes (by network carrier or by the user).

The SIM profile document 606 includes a SIM profile containing various data fields describing a live status the SIM. In some embodiments, the SIM profile document 606 includes at least one of: a data field containing information regarding the profile type (e.g., identity of the profile by carrier, SIM vendor providing the profile, version of the profile, etc.); a data field containing information regarding the state of the profile (e.g., whether the profile is allocated, linked, downloaded, and installed); a data field containing information regarding the first Personal Identification Number (PIN) assigned to the SIM card; a data field containing information regarding the second Personal Identification Number (PIN) assigned to the SIM card, if any; a data field containing status of the first and/or second PIN; information regarding the International Mobile Subscriber Identity (IMSI) assigned to the user of the device; and a data field containing information regarding the unique identifier (id) in the SILS for the SIM container that this profile is loaded into. It should be understood that other information related to the SIM may also be included in the SIM profile document 606.

Likewise, the eSIM profile document 610 includes one or more eSIM profiles containing various data fields describing each SIM. For example, if the eUICC container contains 9 eSIMs, the eSIM profile document 610 includes 9 eSIM profiles (N=9) respectively corresponding to the 9 eSIMs. In some embodiments, each eSIM profile includes at least one of: a data field containing information regarding the profile type (e.g., identity of the profile by carrier, eSIM vendor providing the profile, version of the profile, etc.) for the corresponding eSIM; a data field containing information regarding the state of the profile (e.g., whether the profile is allocated, linked, downloaded, and installed) for the corresponding eSIM; a data field containing information regarding the first Personal Identification Number (PIN) assigned to the corresponding eSIM; a data field containing information regarding the second Personal Identification Number (PIN) assigned to the corresponding eSIM, if any; a data field containing status of the first and/or second PIN for the corresponding eSIM; a data field containing information regarding the International Mobile Subscriber Identity (IMSI) assigned to the user of the device for the corresponding eSIM; and a data field containing information regarding the unique identifier (_id) in the SILS for the eSIM container that this profile is loaded into. It should be understood that other information related to the eSIM may also be included in the eSIM profile document 610.

FIG. 7A is a flowchart diagram illustrating an example method 700 according to various embodiments. The method 700 may be used for generating a serialized inventory; generating a SILS data structure for inventory management or tracking an inventory item (e.g., a subscriber mobile device). In the illustrated example, the method 700 includes operations 702, 704, 706, 708, and 710. Additional operations may be performed. Also, it should be understood that the sequence of the various operations discussed above with reference to FIG. 7A is provided for illustrative purposes, and as such, other embodiments may utilize different sequences.

At operation 702, a device document according to the present disclosure is generated. At operation 704, a UICC (SIM container) document according to the present disclosure is generated. In some embodiments, the UICC corresponds to a removable SIM card that is operably attached to the device. At operation 706, a SIM profile document according to the present disclosure is generated. The SIM profile document corresponds to the UICC and includes a SIM profile containing various data attributes describing the SIM. At operation 708, an eUICC (eSIM container) document according to the present disclosure is generated. In some embodiments, the eUICC contains at least one eSIM embedded into or integrated with the device. At operation 710, an eSIM profile document according to the present disclosure is generated. The eSIM profile document corresponds to the eUICC and includes at least one eSIM profile containing various data attributes describing the corresponding eSIM. In some embodiments, the method 700 further includes generating a plurality of SILS data structures respectively corresponding to a plurality of inventory items of an inventory; and store the plurality of SILS data structures in a SILS data model.

FIG. 7B is a flowchart diagram illustrating an example method 750 according to various embodiments. The method 750 may be used for managing an inventory or tracking an inventory item. In the illustrated example, the method 750 includes operations 752, 754, 756, 758, and 760. Additional operations may be performed. Also, it should be understood that the sequence of the various operations discussed above with reference to FIG. 7B is provided for illustrative purposes, and as such, other embodiments may utilize different sequences.

At operation 752, a SILS data structure for an inventory item (e.g., a device) is generated, for example, by implementing the method 700. Serialized information regarding the device is recorded and stored in the SILS data structure. At operation 754, the device is tracked by communication with the device. In some embodiments, a wireless signal is transmitted to the device through the SIM attached to the device and/or the eSIM embedded into the device. The wireless signal contains an inquiry to a live status of the device, or the UICC or SIM associated to the device, or the eUICC or eSIM associated to the device. In some embodiments, a backend system 102 of FIG. 1 or a SIMS of FIG. 2 may be operated to communicate with the SIM and/or the eSIM that is associated with the device. In some embodiments, a responsive signal containing data or information indicating a live status of the device with respect to the UICC, SIM, eUICC, or eSIM is transmitted to and received by the backend system or a SIMS.

At operation 756, the live status of the device is determined. In some embodiments, the live status may be determined through further analysis and data processing by the event handler of the backend system or the SILS data processing module of the SIMS. Examples of the live status include but are not limited to a current lock/unlock status of the device, a current financial eligibility status of the device for unlocking, a future date for unlocking, a current status of the network service with respect to a SIM or an eSIM, and so on. In some embodiments, a status change of the device with respect to the device, UICC, SIM, eUICC, or eSIM is determined by comparing the current live status to a preceding status that has been previously obtained and recorded in the data structure. At operation 758, the SILS data structure is updated with the received information and the determined live status of the device. In some embodiments, corresponding changes are made to the device document, the UICC document, the SIM profile document, the eUICC document, and the eSIM profile document to reflect the change of the status of the device. At operation 760, communication with the user of the device is performed to inform the user of the live status and the change of status of the device with respect to the device, the UICC, SIM, eUICC, or eSIM.

Figure 8:
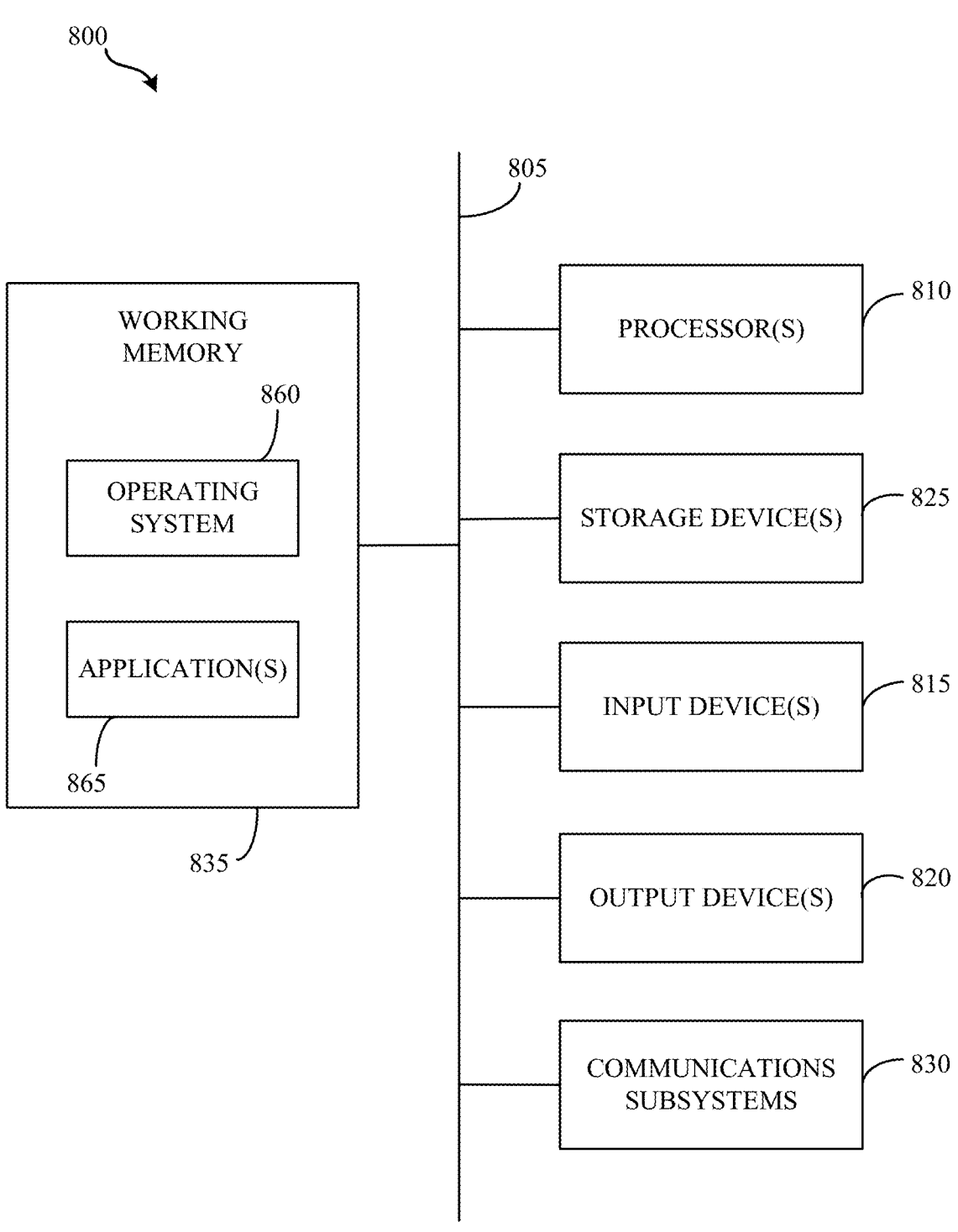
FIG. 8 is a schematic diagram illustrating an example of a computer system according to various embodiments.

FIG. 8 is a schematic diagram illustrating an example of computer system 800. The computer system 800 is a simplified computer system that can be used implement various embodiments described and illustrated herein.

A computer system 800 as illustrated in FIG. 8 may be incorporated into devices such as a portable electronic device, mobile phone, or other device as described herein. FIG. 8 provides a schematic illustration of one embodiment of a computer system 800 that can perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805, or may otherwise be in communication, as appropriate. The hardware elements may include one or more processors 810, including without limitation one or more general-purpose processors and/or one or more special-purpose processors such as digital signal processing chips, graphics acceleration processors, and/or the like; one or more input devices 815, which can include without limitation a mouse, a keyboard, a camera, and/or the like; and one or more output devices 820, which can include without limitation a display device, a printer, and/or the like.

The computer system 800 may further include and/or be in communication with one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset such as a Bluetooth™ device, an 602.11 device, a WiFi device, a WiMax device, cellular communication facilities, etc., and/or the like. The communications subsystem 830 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 830. In other embodiments, a portable electronic device, e.g., the first electronic device, may be incorporated into the computer system 800, e.g., an electronic device as an input device 815. In some embodiments, the computer system 800 will further comprise a working memory 835, which can include a RAM or ROM device, as described above.

The computer system 800 also can include software elements, shown as being currently located within the working memory 835, including an operating system 860, device drivers, executable libraries, and/or other code, such as one or more application programs 865, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 8, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 825 described above. In some cases, the storage medium might be incorporated within a computer system, such as computer system 800. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 800 and/or might take the form of source and/or installable code, which, upon compilation and/or installation on the computer system 800 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 800 to perform methods in accordance with various embodiments of the technology. According to a set of embodiments, some or all of the procedures of such methods are performed by the computer system 800 in response to processor 810 executing one or more sequences of one or more instructions, which might be incorporated into the operating system 860 and/or other code, such as an application program 865, contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 and/or components thereof generally will receive signals, and the bus 805 then might carry the signals and/or the data, instructions, etc. carried by the signals to the working memory 835, from which the processor(s) 810 retrieves and executes the instructions. The instructions received by the working memory 835 may optionally be stored on a non-transitory storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system, comprising:
one or more processors; and
a computer-readable memory comprising instructions that, when executed by the one or more processors, cause the system to:
generate a data structure for a user device from an inventory of user devices, the data structure comprising:
a device document containing a general product profile of a device from an inventory and a first device identity profile of the device, wherein the general product profile is generated before the device leaves the inventory;
an embedded universal integrated circuit card (eUICC) document containing multiple data fields describing an eUICC embedded in the device, wherein the eUICC contains at least one embedded subscriber identification module (eSIM); and
an eSIM profile document comprising at least one eSIM profile corresponding to the at least one eSIM contained in the eUICC, wherein the at least one eSIM profile contains multiple attributes describing the eSIM;
track the user device by transmitting a wireless signal to the user device, the wireless signal containing an inquiry to a live status of the user device with respect to the user device, the eUICC, the eSIM, the UICC, and the SIM;
receive a responsive signal from the user device, the responsive signal containing data or information indicating a live status of the device with respect to the user device, the eUICC, the eSIM, the UICC, and the SIM;
determine a change of status of the user device;
update the data structure to incorporate the live status of the user device with respect to the user device, the eUICC, the eSIM, the UICC, and the SIM; and
initiate a communication with a user of the user device to inform the user of the live status and the change of status of the user device with respect to the device, the UICC, SIM, eUICC, and eSIM.

2. The system according to claim 1, wherein the data structure further comprises:
a second device identity profile of the device, wherein the second device identity profile is included in the device document;
a universal integrated circuit card (UICC) document containing multiple data fields describing a UICC removably and operably attached to the device, wherein the UICC contains at least one subscriber identification module (SIM) card; and a SIM profile document containing multiple attributes describing the SIM.

3. The system according to claim 1, wherein the general product profile comprises at least one of:

a first data field containing information regarding a type of document for the general product profile;

a second data field containing a SKU number assigned to the device;

a third data field containing information regarding a current disposition of the device;

a fourth data field containing information regarding a brand of the device and legal values thereof to be determined or enforced by upstream services; and a fifth data field containing information regarding a current owner of the device.

4. The system according to claim 1, wherein the first device identity profile comprises:

a first data field containing a first IMEI number assigned to a first radio chip installed in the device, the first IMEI number corresponding to the eUICC.

5. The system according to claim 2, wherein the second device identity profile comprises:

a first data field containing a second IMEI number assigned to a second radio chip installed in the device, the second IMEI number corresponding to the UICC.

6. The system according to claim 1, wherein the eUICC document comprises:

a first data field containing an embedded integrated circuit card identifier (EID) number assigned to the eUICC;

a second data field containing information regarding an installation status of the eUICC and the at least one eSIM contained therein; and a third data field containing information regarding a manner the eSIM can be triggered for changes.

7. The system according to claim 1, wherein the eUICC contains a plurality of eSIMs.

8. The system according to claim 1, wherein each of the at least one eSIM profile comprises:

a first data field containing a carrier identity of the eSIM, a vendor identity providing the eSIM, and a version of the eSIM profile;

a second data field containing information regarding a current live status of the eSIM;

a third data field containing a first personal identification number (PIN) assigned to the eSIM;

a fourth data field containing information regarding a status of the first PIN assigned to the eSIM;

a fifth data field containing information regarding an international mobile subscriber identity (IMSI) assigned to the device with respect to the eSIM; and a six data field containing information regarding a unique identifier in the data structure wherein the eSIM profile is loaded into.

9. A computer-implemented method comprising:

generating a data structure for a user device from an inventory of user devices, the data structure comprising:

a device document containing a general product profile of the user device and a first device identity profile of the user device;

an embedded universal integrated circuit card (eUICC) document containing multiple data fields describing an eUICC embedded in the user device, wherein the eUICC contains at least one embedded subscriber identification module (eSIM);

an eSIM profile document comprising at least one eSIM profile corresponding to the at least one eSIM contained in the eUICC, wherein the at least one eSIM profile contains multiple attributes describing the eSIM;

a second device identity profile of the device, wherein the second device identity profile is included in the device document;

a universal integrated circuit card (UICC) document containing multiple data fields describing a UICC removably and operably attached to the device, wherein the UICC contains at least one subscriber identification module (SIM) card; and a SIM profile document containing multiple attributes describing the SIM;

tracking the user device by transmitting a wireless signal to the user device, the wireless signal containing an inquiry to a live status of the user device with respect to the user device, the eUICC, the eSIM, the UICC, and the SIM;

receiving a responsive signal from the user device, the responsive signal containing data or information indicating a live status of the device with respect to the user device, the eUICC, the eSIM, the UICC, and the SIM;

determining a change of status of the user device;

updating the data structure to incorporate the live status of the user device with respect to the user device, the eUICC, the eSIM, the UICC, and the SIM; and initiating a communication with a user of the user device to inform the user of the live status and the change of status of the user device with respect to the device, the UICC, SIM, eUICC, and eSIM.

10. The method according to claim 9, wherein the general product profile comprises at least one of:

a first data field containing information regarding a type of document for the general product profile;

a second data field containing a SKU number assigned to the device;

a third data field containing information regarding a current disposition of the device;

a fourth data field containing information regarding a brand of the device and legal values thereof to be determined or enforced by upstream services; and a fifth data field containing information regarding a current owner of the device.

11. The method according to claim 9, wherein the first device identity profile comprises:

a first data field containing a first IMEI number assigned to a first radio chip installed in the device, the first IMEI number corresponding to the eUICC.

12. The method according to claim 9, wherein the second device identity profile comprises:

a first data field containing a second IMEI number assigned to a second radio chip installed in the device, the second IMEI number corresponding to the UICC.

13. The method according to claim 9, wherein the eUICC document comprises:

a first data field containing an embedded integrated circuit card identifier (EID) number assigned to the eUICC;

a second data field containing information regarding an installation status of the eUICC and the at least one eSIM contained therein; and a third data field containing information regarding a manner the eSIM can be triggered for changes.

14. The method according to claim 9, wherein each of the at least one eSIM profile comprises:

a first data field containing a carrier identity of the eSIM, a vendor identity providing the eSIM, and a version of the eSIM profile;

a second data field containing information regarding a current live status of the eSIM;

a third data field containing a first personal identification number (PIN) assigned to the eSIM;

a fourth data field containing information regarding a status of the first PIN assigned to the eSIM;

a fifth data field containing information regarding an international mobile subscriber identity (IMSI) assigned to the device with respect to the eSIM; and a six data field containing information regarding a unique identifier in the data structure wherein the eSIM profile is loaded into.

15. A computerized system comprising:

one or more electronic processors;

a machine-readable storage medium in electronic communication with the one or more electronic processors; and instructions stored in the machine-readable storage medium and executable by the one or more electronic processors to cause the system to:

generate a data structure for a user device from an inventory of user devices, the data structure comprising:

a device document containing a general product profile of the user device and a first device identity profile of the user device;

an embedded universal integrated circuit card (eUICC) document containing multiple data fields describing an eUICC embedded in the user device, wherein the eUICC contains at least one embedded subscriber identification module (eSIM);

an eSIM profile document comprising at least one eSIM profile corresponding to the at least one eSIM contained in the eUICC, wherein the at least one eSIM profile contains multiple attributes describing the eSIM;

a second device identity profile of the device, wherein the second device identity profile is included in the device document;

a universal integrated circuit card (UICC) document containing multiple data fields describing an UICC removably and operably attached to the device, wherein the UICC contains at least one subscriber identification module (SIM) card; and a SIM profile document containing multiple attributes describing the SIM;

track the user device by transmitting a wireless signal to the user device, the wireless signal containing an inquiry to a live status of the user device with respect to the user device, the eUICC, the eSIM, the UICC, and the SIM;

receive a responsive signal from the user device, the responsive signal containing data or information indicating a live status of the device with respect to the user device, the eUICC, the eSIM, the UICC, and the SIM;

determine a change of status of the user device; and update the data structure to incorporate the live status of the user device with respect to the user device, the eUICC, the eSIM, the UICC, and the SIM.

16. The computerized system according to claim 15, wherein the one or more electronic processors are further instructed to cause the system to initiate a communication with a user of the user device to inform the user of the live status and the change of status of the user device with respect to the device, the UICC, SIM, eUICC, and eSIM.

17. The computerized system according to claim 15, wherein the general product profile comprises at least one of:

a first data field containing information regarding a type of document for the general product profile;

a second data field containing a SKU number assigned to the device;

a third data field containing information regarding a current disposition of the device;

a fourth data field containing information regarding a brand of the device and legal values thereof to be determined or enforced by upstream services; and a fifth data field containing information regarding a current owner of the device.

18. The computerized system according to claim 15, wherein the first device identity profile comprises a first data field containing a first IMEI number assigned to a first radio chip installed in the device, the first IMEI number corresponding to the eUICC, and the second device identity profile comprises a first data field containing a second IMEI number assigned to a second radio a chip installed in the device, the second IMEI number corresponding to the UICC.

19. The computerized system according to claim 15, wherein the eUICC document comprises:

a first data field containing an embedded integrated circuit card identifier (EID) number assigned to the eUICC;

a second data field containing information regarding an installation status of the eUICC and the at least one eSIM contained therein; and a third data field containing information regarding a manner the eSIM can be triggered for changes.

20. The computerized system according to claim 15, wherein each of the at least one eSIM profile comprises:

a first data field containing a carrier identity of the eSIM, a vendor identity providing the eSIM, and a version of the eSIM profile;

a second data field containing information regarding a current live status of the eSIM;

a third data field containing a first personal identification number (PIN) assigned to the eSIM;

a fourth data field containing information regarding a status of the first PIN assigned to the eSIM;

a fifth data field containing information regarding an international mobile subscriber identity (IMSI) assigned to the device with respect to the eSIM; and a six data field containing information regarding a unique identifier in the data structure wherein the eSIM profile is loaded into.

* * * * *